United States Patent
Chen

(10) Patent No.: US 10,203,557 B2
(45) Date of Patent: Feb. 12, 2019

(54) ALIGNMENT METHOD SUITABLE FOR PSVA LIQUID CRYSTAL DISPLAY PANEL

(71) Applicant: Shenzhen China Star Optoelectronics Technology Co., Ltd., Shenzhen (CN)

(72) Inventor: Xingwu Chen, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 14/897,715

(22) PCT Filed: Sep. 24, 2015

(86) PCT No.: PCT/CN2015/090554
§ 371 (c)(1),
(2) Date: Dec. 21, 2017

(87) PCT Pub. No.: WO2017/020412
PCT Pub. Date: Feb. 9, 2017

(65) Prior Publication Data
US 2018/0157126 A1    Jun. 7, 2018

(30) Foreign Application Priority Data

Jul. 31, 2015 (CN) .......................... 2015 1 0460229

(51) Int. Cl.
*G02F 1/1337* (2006.01)

(52) U.S. Cl.
CPC ...... *G02F 1/133788* (2013.01); *G02F 1/1337* (2013.01); *G02F 1/133711* (2013.01); *G02F 2001/133715* (2013.01)

(58) Field of Classification Search
CPC .......... G02F 1/1333; G02F 1/1343; G02F 1/133509; G02F 1/1337; G02F 1/133788; G02F 1/1334; G02F 1/133607; G02F 1/133753; G02F 1/133703; G02F 1/139; G02F 2202/023; G02F 2001/133742; G02F 2001/133715; G02F 2001/133757;
(Continued)

(56) References Cited

U.S. PATENT DOCUMENTS

2003/0048401 A1   3/2003   Hanaoka et al.
2008/0151145 A1   6/2008   Kumazawa et al.
(Continued)

FOREIGN PATENT DOCUMENTS

CN   1379269 A      11/2002
CN   101206365 A    6/2008
(Continued)

OTHER PUBLICATIONS

Notification of Transmittal of the International Search Report and the Written Opinion of the International Searching Authority (Forms PCT/ISA/210, PCT/ISA/237, and PCT/ISA/220) dated May 6, 2016, by the State Intellectual Property Office of People's Republic of China in corresponding International Application No. PCT/CN2015/090554. (12 pages).
(Continued)

*Primary Examiner* — Thoi V Duong

(57) ABSTRACT

Provided is an alignment method suitable for a PSVA liquid crystal display panel, This belongs to the field of display technologies, and can solve the technical problem of a low aperture ratio of an existing PSVA liquid crystal display panel.

10 Claims, 3 Drawing Sheets

(58) Field of Classification Search
CPC .......... G02F 2001/133761; G02F 2001/13775;
C09K 2019/548
See application file for complete search history.

(56) References Cited

U.S. PATENT DOCUMENTS

2011/0304808 A1    12/2011  Jeong et al.
2012/0013835 A1    1/2012   Itoh
2015/0055065 A1    2/2015   Shin et al.

FOREIGN PATENT DOCUMENTS

CN    101387792 A    3/2009
CN    101738808 A    6/2010
CN    102362219 A    2/2012
JP    H06-194656 A   7/1994

OTHER PUBLICATIONS

Office Action dated Jul. 4, 2017 by the State Intellectual Property Office of People's Republic of China in corresponding Chinese Patent Application No. 201510460229.8. (7 pages).

ALIGNMENT METHOD SUITABLE FOR PSVA LIQUID CRYSTAL DISPLAY PANEL

CROSS REFERENCE OF RELATED APPLICATIONS

The present application claims the priority of Chinese patent application CN 201510460229.8, entitled "Alignment method suitable for PSVA liquid crystal display panel" and filed on Jul. 31, 2015, the entirety of which is incorporated herein by reference.

FIELD OF THE INVENTION

The present disclosure relates to the field of display technologies, and in particular, to an alignment method suitable for a PSVA liquid crystal display panel.

BACKGROUND OF THE INVENTION

Vertical alignment (VA for short) liquid crystal display devices can be achieved through a plurality of approaches. According to a first approach, a projection is disposed on a substrate, and liquid crystal molecules are allowed to generate a certain pretilt angle in the vicinity of the projection, so as to be guided to tilt toward a predetermined direction. A second approach comprises etching grooves in indium tin oxide (ITO) electrode layers of an upper substrate and a lower substrate, so as to allow an electric field line to generate a certain tilt angle. Thus, a tilt direction of liquid crystal molecules can be controlled. Such a technology is termed patterned vertical alignment (PVA for short).

In connection with a third approach, an ITO electrode layer provided on an array substrate is etched with a gap, while an ITO electrode layer provided on a color filter substrate is a plate electrode. Meanwhile, a reactive monomer (RM for short) is added in liquid crystals. While a voltage is applied, ultraviolet light can be used to irradiate for polymerization, thereby forming a granular projection on a surface of the substrate, and leading crystal molecules to tilt toward a certain direction. An alignment effect can thus be achieved. This technology is termed polymer stabilized vertical alignment (PSVA for short).

PSVA liquid crystal display devices have such advantages as a high contrast and an ultralow dark state effect. In PSVA liquid crystal display devices of large viewing angles, however, gamma curves would deviate. That is, color shift occurs, thereby deteriorating watching effects. In order to attenuate color shift at a large viewing angle, and enlarge the viewing angle, engineers have divided a sub pixel into a main area and a slave area through a circuit design. Deviation of the gamma curves generated at a large viewing angle of the sub pixel divided into the main area and the slave area can be relieved, thereby attenuating the color shift at a large viewing angle. However, variation in the circuit design would increase the numbers of gate lines, data lines, and thin film transistors, thereby decreasing an aperture ratio and increasing drive difficulty.

SUMMARY OF THE INVENTION

The present disclosure aims to provide an alignment method suitable for a PSVA liquid crystal display panel, and can be used to solve the technical problem of a low aperture ratio of an existing PSVA liquid crystal display panel.

The present disclosure provides an alignment method suitable for a PSVA liquid crystal display panel, wherein a liquid crystal layer doped with photopolymerizable monomers is filled between two substrates of the liquid crystal display panel, and wherein the method comprises the steps of:

acquiring a semi-transparent mask, which comprises a plurality of areas of different transmittance from each other;

applying an alternating voltage to the liquid crystal display panel, so as to allow liquid crystal molecules and the photopolymerizable monomers in the liquid crystal layer to tilt along certain directions maintaining application of the alternating voltage, and using the semi-transparent mask to perform light treatment on the liquid crystal display panel, so as to allow the photopolymerizable monomers to polymerize on surfaces of the two substrates and form granular polymers, such that liquid crystal molecules in different areas tilt at different angles; and stopping the application of the alternating voltage, and using the semi-transparent mask to further perform light treatment on the liquid crystal display panel, until completion of polymerization of the photopolymerizable monomers.

Optionally, the method comprises maintaining application of the alternating voltage, and using the semi-transparent mask to perform light treatment on the liquid crystal display panel for a period of time ranging from 0 to 200 s.

Optionally, the method comprises stopping the application of the alternating voltage, and using the semi-transparent mask to further perform light treatment on the liquid crystal display panel for a period of time ranging from 1 to 2 h.

Optionally, the liquid crystal molecules in the liquid crystal display panel are negative liquid crystal molecules.

Optionally, the liquid crystal molecules have a tilt angle ranging from 85° to 90°.

Optionally, light used for the light treatment has a wavelength ranging from 313 to 365 nm.

Optionally, the photopolymerizable monomers have a reaction temperature ranging from 30 to 60° C.

Optionally, the semi-transparent mask comprises a first area and a second area of different transmittance from each other.

Optionally, the liquid crystal display panel is provided with a tabulate common electrode on an upper substrate thereof, and a fish-hone shape pixel electrode on a lower substrate thereof.

Optionally, ultraviolet light is used for the light treatment.

The present disclosure brings about the following beneficial technical effects. The embodiment of the present disclosure provides the alignment method suitable for the PSVA liquid crystal display panel, wherein the liquid crystal layer doped with the photopolymerizable monomers is filled between the two substrates of the liquid crystal display panel. When the alternating voltage is applied to the liquid crystal display panel, the semi-transparent mask having a plurality of areas of different transmittance is used to perform light treatment on the liquid crystal display panel, so as to allow the photopolymerizable monomers to polymerize on the surfaces of two substrates and form the granular polymers. The liquid crystal molecules in different areas have different tilt angles. In addition, when the alternating voltage is removed, the light treatment is further performed, until completion of polymerization of the photopolymerizable monomers. The PSVA liquid crystal display panel obtained through the alignment method has a plurality of alignment areas. The liquid crystal molecules in different alignment areas have different pretilt angles, such that phenomenon of color shift of the PSVA liquid crystal display panel can be reduced, and the high aperture ratio of the PSVA liquid crystal display panel can be ensured, without additional arrangement of such structures as gate lines, data lines, and thin film transistors.

Other features and advantages of the present disclosure will be further explained in the following description, and partly become self-evident therefrom, or be understood through implementation of the present disclosure. The objectives and advantages of the present disclosure will be achieved through the structure specifically pointed out in the description, claims, and the accompanying drawings.

BRIEF DESCRIPTION OF THE DRAWINGS

In order to explicitly illustrate the technical solution in the embodiment of the present disclosure, accompanying drawings that will be referred to in illustrating the embodiments will be simply explained, in which.

DETAILED DESCRIPTION OF THE EMBODIMENTS

Figure 1:
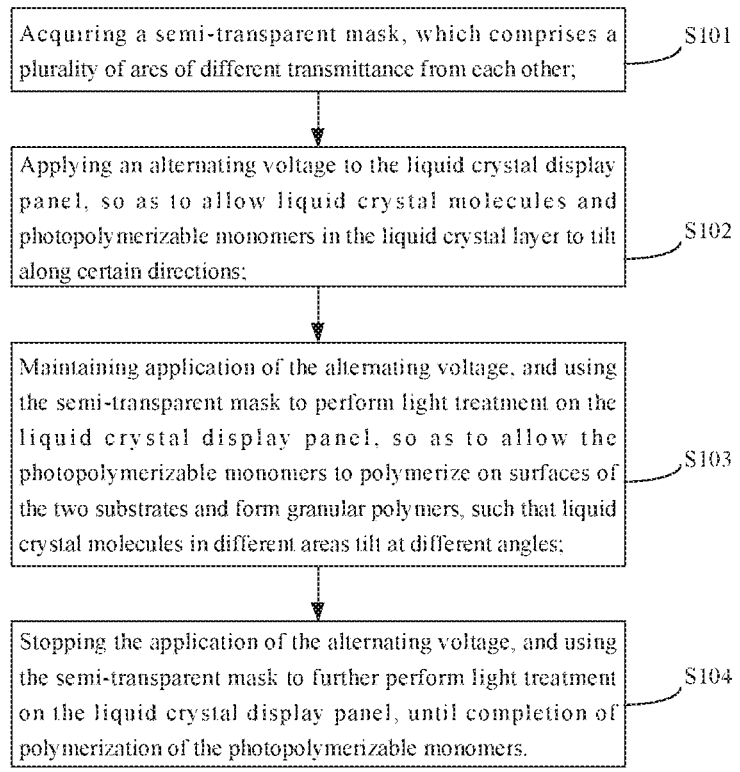
FIG. 1 schematically shows a flow chart of an alignment method suitable for a PSVA liquid crystal display panel provided in an embodiment of the present disclosure.

The present disclosure will be explained in detail with reference to the embodiments and the accompanying drawings, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the embodiments may be combined together in any manner, and the technical solutions obtained in this manner all fall within the scope of the present disclosure.

The present disclosure provides an alignment method suitable for a PSVA liquid crystal display panel. The liquid crystal display panel comprises an upper substrate 11, a lower substrate 12 arranged in parallel with the upper substrate 11, and a liquid crystal layer tilled therebetween. While the liquid crystal layer is being formed, a liquid crystal material doped with photopolymerizable monomers 4 is used. The photopolymerizable monomers 4 can be used to allow liquid crystal molecules 3 to be aligned in specific directions, so as to form a specific alignment area. Granular polymers 5 formed by polymerization of the photopolymerizable monomers 4 in the alignment area can limit orientation of the liquid crystal molecules 3, so as to achieve alignment of the PSVA liquid crystal display panel.

Specifically, as shown in FIG. 1, the alignment method suitable for the PSVA liquid crystal display panel comprises the following steps.

In step S101, a semi-transparent mask comprising a plurality of areas of different transmittance from each other is acquired.

The semi-transparent mask comprises a plurality of areas having different transmittance from each other, and each of the plurality of areas corresponds to a different portion of a sub pixel in the liquid crystal display panel. For example, in connection with a liquid crystal display panel having a large viewing angle, each sub pixel includes a main area and a slave area. The acquired semi-transparent mask for such a sub pixel includes a first area 61 corresponding to the main area, and a second area 62 corresponding to the slave area. In the embodiment of the present disclosure, formation of the sub pixel that has the main area and the slave area will be referred to as an example for detailed explanations.

In the embodiment of the present disclosure, the main area accounts for 40% of a transparent area of the sub pixel, and the slave area takes up 60% of the transparent area thereof. Obviously, space allocation of the main area and the slave area is not limited hereto, and can be determined as per actual conditions.

In step S102, an alternating voltage is applied to the liquid crystal display panel, so as to allow the liquid crystal molecules and the photopolymerizable monomers in the liquid crystal layer to tilt along certain directions.

Figure 2:
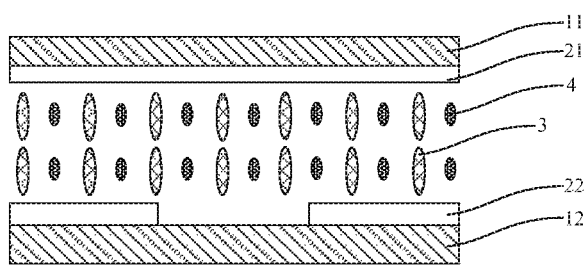
FIGS. 2-5 schematically show alignment steps of the liquid crystal display panel provided in the embodiment of the present disclosure.

As FIG. 2 illustrates, the PSVA liquid crystal display panel is provided with a tabulate common electrode 21 on the upper substrate 11 thereof, and a fish-bone shape pixel electrode 22 on the lower substrate 12 thereof. Because the liquid crystal molecules 3 in the liquid crystal display panel of the embodiment according to the present disclosure are negative liquid crystal molecules, the photopolymerizable monomers 4 and the liquid crystal molecules 3 that are filled between the upper substrate 11 and the lower substrate 12 are all arranged perpendicular to the upper substrate 11 and the lower substrate 12, prior to application of an electric field.

Figure 3:
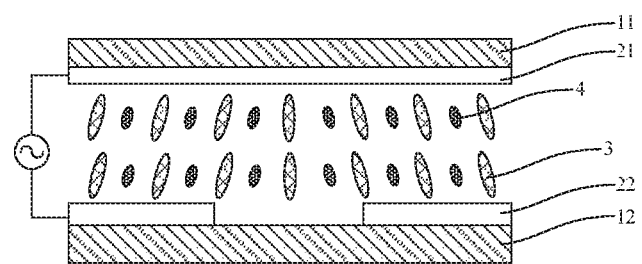

After the alternating voltage is applied between the upper substrate 11 and the lower substrate 12, the liquid crystal molecules 3 and the photopolymerizable monomers 4 tilt under the effect of the electric filed applied between the upper substrate 11 and the lower substrate 12, and realign in accordance with directions of the electric field, to form small tilt angles with respect to the previous perpendicular arrangement. Specifically, the liquid crystal molecules 3, after the alternating voltage is applied, tend to align in a direction perpendicular to that of the electric filed. Therefore, as depicted in FIG. 3, influenced by directions of the electric filed, the liquid crystal molecules 3 tilt towards different directions.

In step S103, application of the alternating voltage is maintained, and the semi-transparent mask is used to perform light treatment on the liquid crystal display panel, so as to allow the photopolymerizable monomers to polymerize on surfaces of the two substrates and form granular polymers. As a result, the liquid crystal molecules in different areas tilt at different angles.

Having the property of photopolymerization, the photopolymerizable monomers 4 will polymerize and be cured upon light illumination of sufficient energy. In the embodiment of the present disclosure, ultraviolet light having a wavelength ranging from 313 to 365 nm is used for the light treatment, and the reaction temperature of the photopolymerizable monomers 4 is controlled within the range from 30 to 60° C., so as to guarantee favorable photopolymerization effects.

While application of the alternating voltage is maintained, the semi-transparent mask is used to perform light treatment on the liquid crystal display panel for a period. of time ranging from 0 to 200 s. This is to use the granular polymers 5 generated in polymerization of the photopolymerizable monomers 4, to secure the liquid crystal molecules 3 at certain tilt angles.

Figure 4:
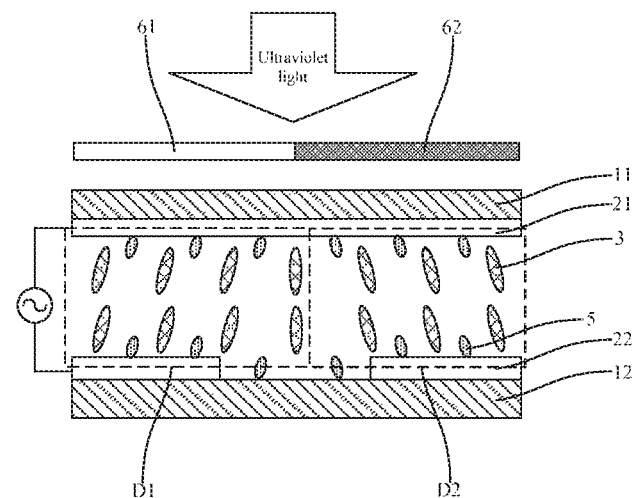

As shown in FIG. 4, as the semi-transparent mask comprises the first area 61 and the second area 62 of different transmittance from each other, when the semi-transparent mask is used to perform light treatment, ultraviolet light, after passing through the semi-transparent mask, will form two areas having different amounts of light energy from each other. The photopolymerizable monomers 4 will polymerize and be cured to produce polymers of different molecular structures under different amounts of energy. Hence, two alignment areas will be defined in the sub pixel. The liquid crystal molecules 3 in the two different alignment areas have different tilt angles. In addition, after the alternating voltage applied between the upper substrate 11 and the lower substrate 12 is removed, the liquid crystal molecules 3 located at the two different alignment areas will present different, specific pretilt angles, which are not perpendicular to the upper substrate 11 and the lower substrate 12.

In step S104, application of the alternating voltage is stopped, and the semi-transparent mask is further used to perform light treatment on the liquid crystal display panel, until completion of polymerization of the photopolymerizable monomers.

Figure 5:
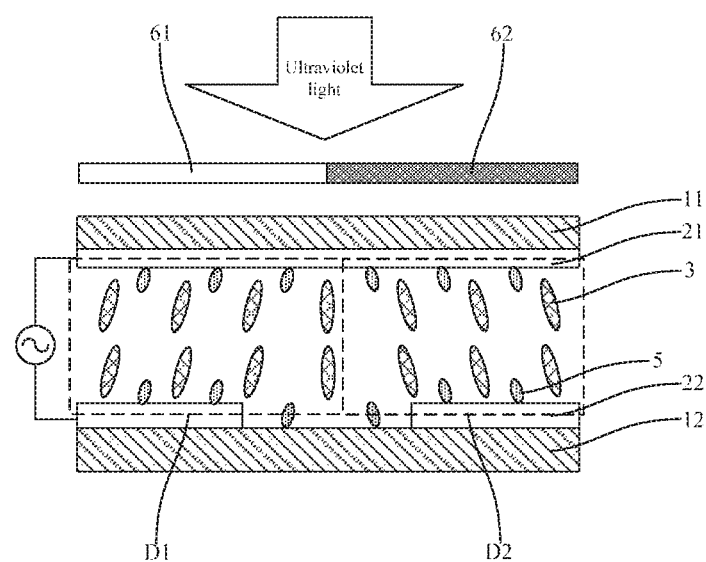

In a manufacturing procedure, the duration for the light treatment should be as short as possible, so as to improve manufacturing efficiency of the liquid crystal display panel. However, excessively rapid polymerization might be incomplete, and the remaining unpolymerized monomers would cause unexpected image retention. After the application of the alternating voltage is stopped, the semi-transparent mask is used to further perform light treatment on the liquid crystal display panel for 1 to 2. hours, so as to ensure complete polymerization of the photopolymerizable monomers 4, as shown in FIG. 5.

During image display performed by the sub pixel, the liquid crystal molecules 3 of different pretilt angles will be driven at different threshold voltages. Therefore, while one single sub pixel performs image display, different alignment areas in the sub pixel can present different display brightness. As a result, formation of a plurality of alignment areas in the sub pixel will contribute to reduction of the phenomenon of color shift at large viewing angles larger than or equal to 60 degrees. In addition, compared with existing technologies that can eliminate the phenomenon of color shift, it is unnecessary to increase the number of gate lines, data lines, or thin film transistors by virtue of formation of the plurality of alignment areas through light treatment. The liquid crystal display panel can thus have a relatively high display aperture ratio, without requirements of any complex drive modes to be arranged for the sub pixel.

In particular, when the semi-transparent mask is provided with the first area 61 and the second area 62 of different transmittance from each other, the sub pixel forms a first alignment area D1 and a second alignment area D2, respectively corresponding to the main area and the slave area of the sub pixel. The liquid crystal molecules 3 will present different pretilt angles in the first alignment area D1 and the second alignment area D2. Due to different pretilt angels of the liquid crystal molecules 3 in the first alignment area D1 and the second alignment area D2, the liquid crystal molecules 3 will have different final angles in the first alignment area D1 and the second alignment area D2, even when the entire sub pixel is applied with a same voltage. Therefore, the liquid crystal display panel can present a fine display quality.

The present disclosure will, of course, not limit the pretilt angles of the liquid crystal molecules 3 in the first alignment area Di and the second alignment area D2 to any sizes, so long as the liquid crystal molecules 3 present different pretilt angles in the first alignment area D1 and the second alignment area D2.

To conclude the above, the embodiment of the present disclosure provides the alignment method suitable for the PSVA liquid crystal display panel, wherein the liquid crystal layer doped with the photopolymerizable monomers 4 is filled between the two substrates of the liquid crystal display panel. When the alternating voltage is applied to the liquid crystal display panel, the semi-transparent mask having a plurality of areas of different transmittance is used to perform light treatment on the liquid crystal display panel, so as to allow the photopolymerizable monomers 4 to polymerize on the surfaces of the two substrates and form the granular polymers 5. The liquid crystal molecules 3 in different areas have different tilt angles. In addition, when the alternating voltage is removed, the light treatment is further performed, until completion of polymerization of the photopolymerizable monomers 4. The PSVA liquid crystal display panel obtained through the alignment method has a plurality of alignment areas. The liquid crystal molecules 3 in different alignment areas have different pretilt angles. The phenomenon of color shift of the PSVA liquid crystal display panel can be reduced, and the high aperture ratio of the PSVA liquid crystal display panel can be ensured, without additional arrangement of such structures as gate lines, data lines, and thin film transistors.

The above embodiments are described only for better understanding, rather than restricting, the present disclosure. Any person skilled in the art can make amendments to the implementing forms or details without departing from the spirit and scope of the present disclosure. The scope of the present disclosure should still be subject to the scope defined in the claims.

The invention claimed is:

1. An alignment method suitable for a PSVA liquid crystal display panel, wherein a liquid crystal layer doped with photopolymerizable monomers is filled between two substrates of the liquid crystal display panel, and
    wherein the method comprises the steps of:
    acquiring a semi-transparent mask, which comprises a plurality of areas of different transmittance from each other;
    applying an alternating voltage to the liquid crystal display panel, so as to allow liquid crystal molecules and the photopolymerizable monomers in the liquid crystal layer to tilt along certain directions;
    maintaining application of the alternating voltage, and using the semi-transparent mask to perform light treatment on the liquid crystal display panel, so as to allow the photopolymerizable monomers to polymerize on surfaces of the two substrates and form granular polymers, such that liquid crystal molecules in different areas tilt at different angles; and
    stopping the application of the alternating voltage, and using the semi-transparent mask to further perform light treatment on the liquid crystal display panel, until completion of polymerization of the photopolymerizable monomers.

2. The method according to claim 1, comprising maintaining application of the alternating voltage, and using the semi-transparent mask to perform light treatment on the liquid crystal display panel for a period of time ranging from 0 to 200 s.

3. The method according to claim 1, comprising stopping the application of the alternating voltage, and using the semi-transparent mask to further perform light treatment on the liquid crystal display panel for a period of time ranging from 1 to 2 h.

4. The method according to claim 1, wherein the liquid crystal molecules in the liquid crystal display panel are negative liquid crystal molecules.

5. The method according to claim 1, rein the liquid crystal molecules have a tilt angle ranging from 85° to 90°.

6. The method according to claim 1, wherein light used for the light treatment has a wavelength ranging from 313 to 365 nm.

7. The method according to claim 1, wherein the photopolymerizable monomers have a reaction temperature ranging from 30 to 60° C.

8. The method according to claim 1, wherein the semi-transparent mask comprises a first area and a second area of different transmittance from each other.

9. The method according to claim 1, wherein the liquid crystal display panel is provided with a tabulate common electrode on an upper substrate thereof, and a fish-bone shape pixel electrode on a lower substrate thereof.

10. The method according to claim 1, wherein ultraviolet light is used for the light treatment.

* * * * *